United States Patent
Asao et al.

[11] Patent Number: 6,147,431
[45] Date of Patent: Nov. 14, 2000

[54] STATOR CORE AND METHOD OF MANUFACTURE THEREFOR

[75] Inventors: Yoshihito Asao; Masakazu Mori; Katsumi Adachi, all of Tokyo, Japan

[73] Assignee: Mitsubishi Denki Kabushiki Kaisha, Tokyo, Japan

[21] Appl. No.: 09/141,327

[22] Filed: Aug. 27, 1998

[30] Foreign Application Priority Data

Apr. 8, 1998 [JP] Japan .................................. 10-96324

[51] Int. Cl.$^7$ ...................................................... H02K 1/12
[52] U.S. Cl. ............................. 310/254; 310/259; 29/596
[58] Field of Search ............................. 310/254, 42, 216, 310/217, 259; 29/596, 609

[56] References Cited

U.S. PATENT DOCUMENTS

| | | | |
|---|---|---|---|
| 3,670,278 | 6/1972 | Foster et al. ........................... | 336/213 |
| 3,842,493 | 10/1974 | Ohuchi et al. ........................... | 29/596 |
| 4,102,040 | 7/1978 | Rich ........................................ | 29/598 |
| 4,211,944 | 7/1980 | Haller ..................................... | 310/72 |
| 4,364,169 | 12/1982 | Kawano et al. ......................... | 29/596 |
| 4,365,180 | 12/1982 | Licata et al. ............................ | 310/216 |
| 4,392,073 | 7/1983 | Rosenberry, Jr. ....................... | 310/216 |
| 4,613,780 | 9/1986 | Fritzsche ................................ | 310/216 |
| 4,622,835 | 11/1986 | Bisson et al. ........................... | 72/18.8 |

FOREIGN PATENT DOCUMENTS

| | | |
|---|---|---|
| 52-34301 | 3/1977 | Japan . |
| 402106151 | 4/1990 | Japan . |
| 5-184106 | 7/1993 | Japan . |

*Primary Examiner*—Nestor Ramirez
*Assistant Examiner*—Joseph Waks
*Attorney, Agent, or Firm*—Sughrue, Mion, Zinn, Macpeak & Seas, PLLC

[57] ABSTRACT

A plurality of strips formed with tooth portions and core back portions is punched from a single band of sheet steel. Next, a plurality of strips is stacked such that the tooth portions line up together and the core back portions line up together and the stacked plurality of strips is integrated to form a strip lamination. Then, the strip lamination is wound spirally and the wound strip lamination is integrated to obtain a stator core.

1 Claim, 6 Drawing Sheets

STATOR CORE AND METHOD OF MANUFACTURE THEREFOR

BACKGROUND OF THE INVENTION

1. Field of the Invention

This invention relates to a stator core which can be used in a stator in an automobile alternator, for example, and a method of manufacture therefor.

2. Description of the Related Art

FIG. 7 is a perspective view showing a stator core used in the stator of a conventional automobile alternator.

This stator core 1 is composed of a single strip 2 made of sheet steel formed with tooth portions 2a and core back portions 2b, wound spirally such that the tooth portions 2a stack up in line with each other and the core back portions 2b stack up in line with each other, and the core 1 is arc welded on its outer surface so that the spirally wound strip is integrated. Furthermore, the welded portions 3 are disposed circumferentially at a prescribed pitch and further across the entire area in the direction of lamination on the outer surface of the wound strip 2.

Next, the conventional method of manufacture for a stator core 1 will be explained with reference to FIGS. 8 and 9.

First, 1 mm thick, 22 mm wide sheet steel 4 is fed to a press (not shown), which forms the single band of sheet steel 4 into two strips 2 having tooth portions 2a and core back portions 2b as shown in FIG. 8. Next, the two strips 2 are separated and each strip is fed to a winding device. As shown in FIG. 9, each strip 2 is wound around an internal diameter guide cylinder 5 from its leading end and moves downwards as the winding proceeds so that it forms a lamination. At this time, the wound strip 2 is formed to an internal diameter corresponding to the external diameter of the internal diameter guide cylinder 5. Also, the external diameter of the wound strip 2 is controlled by an external diameter guide cylinder 6.

The strip 2 is wound spirally under the control of the internal diameter guide cylinder 5 and the external diameter guide cylinder 6 until the lamination reaches a certain height (thickness) and is then cut. The wound strip 2 is then removed and its outer surface is arc welded to obtain a stator core 1.

As described above, the conventional method of manufacture for a stator core aims to cut costs by making use of the protrusions and recesses in the tooth portions 2a, punching two strips 2 with intermeshed protrusions and recesses from a single long band of sheet steel 4, so that two stator cores 1 can be manufactured from sheet steel 4 having the length necessary for one stator core 1.

However, the problem with the conventional method of manufacture is that the stator core 1 is manufactured by winding a single strip 2, and so if the height of the stator core 1 is increased to raise output, or the sheet is made thinner to reduce core loss, the time required to wind the strip 2 increases and production costs increase.

SUMMARY OF THE INVENTION

An object of the present invention is to overcome the problem mentioned above by providing a stator core in which winding time can be reduced without loss of performance by integrating and winding a plurality of strips, and a method of manufacture therefor.

A stator core according to the present invention is composed of a plurality of strips made of sheet steel formed with tooth portions and core back portions, wherein the plurality of strips are stacked such that the tooth portions line up together and the core back portions line up together, and wound spirally.

Also, a method of manufacture for a stator core according to the present invention is provided with a punching process in which strips having tooth portions and core back portions are punched from a long band of sheet steel, a stacking process in which a plurality of the strips are stacked such that the tooth portions line up together and the core back portions line up together and the stacked plurality of strips are integrated to form a strip lamination, and a winding process in which the strip lamination is wound spirally and the wound strip lamination is integrated.

Also, a method of manufacture for a stator core according to the present invention may be provided with a punching process in which strip laminations having tooth portions and core back portions are punched from a stacked plurality of long bands of sheet steel, and a winding process in which the strip laminations are wound spirally and the wound strip laminations are integrated.

BRIEF DESCRIPTION OF THE DRAWINGS

For a better understanding of the present invention, reference is made of a detailed description to be read in conjunction with the accompanying drawings, in which.

DETAILED DESCRIPTION OF THE PREFERRED EMBODIMENTS

Referring now to drawings, various preferred embodiments according to the present invention will be described in detail.

Embodiment 1

Figure 1:
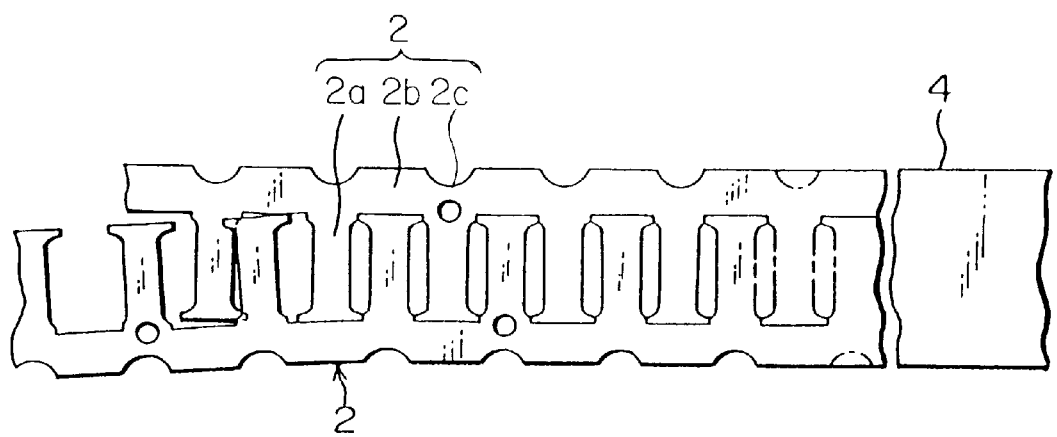
FIG. 1 is a plan view explaining the process of punching sheet steel in the method of manufacture for a stator core according to Embodiment 1 of the present invention.
Figure 2:
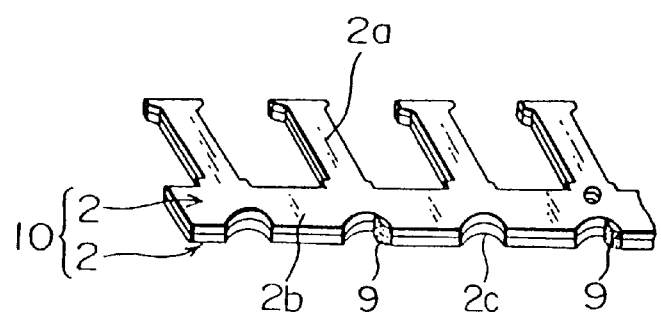
FIG. 2 is a perspective view explaining the process of stacking strips in the method of manufacture for a stator core according to Embodiment 1 of the present invention.
Figure 3:
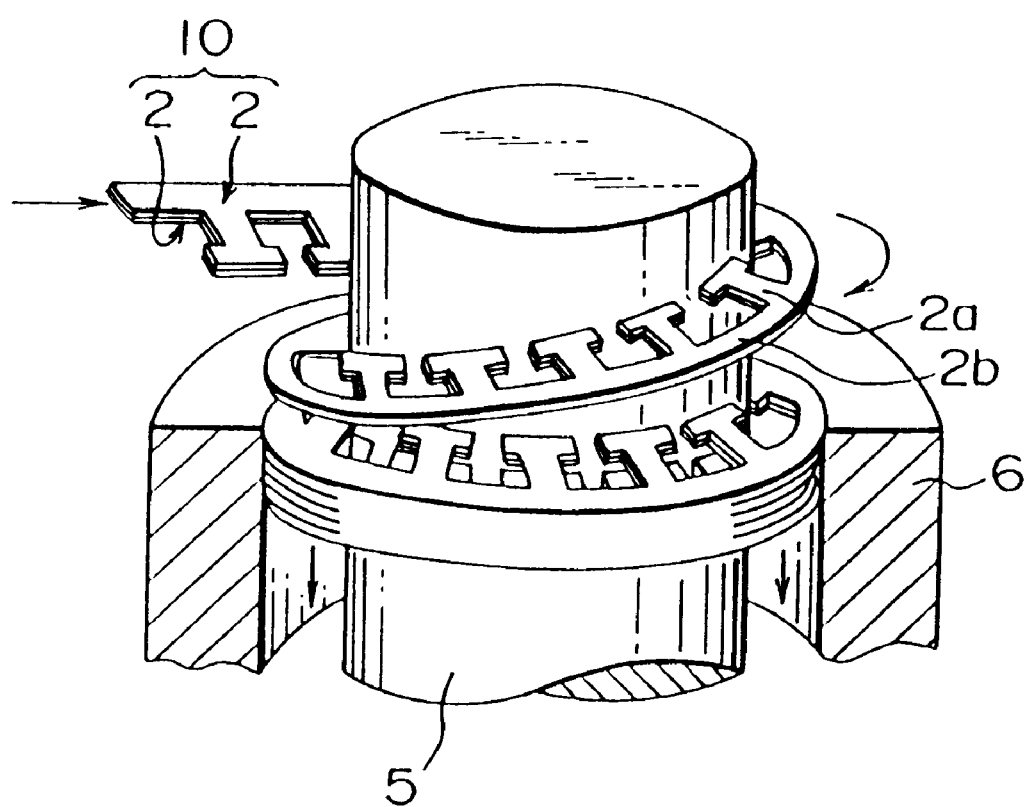
FIG. 3 is a perspective view explaining the process of winding strips in the method of manufacture for a stator core according to Embodiment 1 of the present invention.
Figure 4:
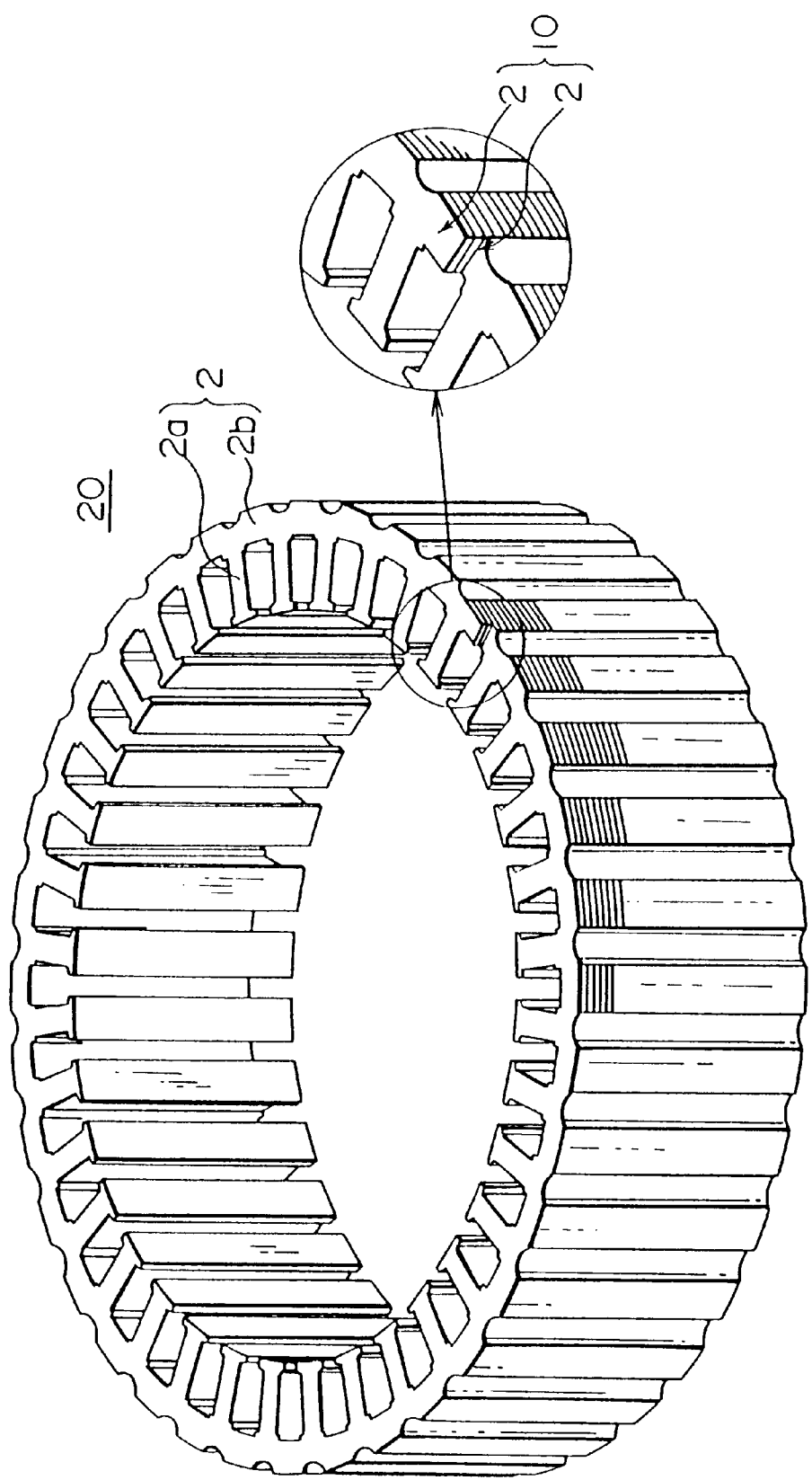
FIG. 4 is a perspective view showing a stator core manufactured by the method of manufacture for a stator core according to Embodiment 1 of the present invention.

FIG. 1 is a plan view explaining the process of punching sheet steel in the method of manufacture for a stator core according to Embodiment 1 of the present invention, FIG. 2 is a perspective view explaining the process of stacking strips in the method of manufacture for a stator core according to Embodiment 1 of the present invention, FIG. 3 is a perspective view explaining the process of winding strips in the method of manufacture for a stator core according to Embodiment 1 of the present invention, and FIG. 4 is a perspective view showing a stator core manufactured by the method of manufacture for a stator core according to Embodiment 1 of the present invention.

Next, a description will now be made of a method for manufacturing the stator core according to this Embodiment 1.

First, 1 mm thick, 22 mm wide sheet steel 4 is fed to a press (not shown), which forms the single band of sheet steel 4 into two strips 2 having tooth portions 2a, core back portions 2b, and notches 2c formed at a position of the core back portion opposite to each of the tooth portions 2c as shown in FIG. 1. Next, the two strips 2 are separated and the strips are turned over and stacked up so that their tooth portions 2a line up together and their core back portions 2b line up together and notches 2c line up together. Then, as shown in FIG. 2, the two stacked strips 2 are welded to make a strip lamination 10. The two strips are welded along an edge at weld portions 9 to integrate them. Next, as shown in FIG. 3, the strip lamination 10 is wound around an internal diameter guide cylinder 5 from its leading end and moves downwards as the winding proceeds so that it forms a lamination. At this time, the wound strip lamination 10 is formed to an internal diameter corresponding to the external diameter of the internal diameter guide cylinder 5. Also, the external diameter of the wound strip lamination 10 is controlled by an external diameter guide cylinder 6.

The strip lamination 10 is wound spirally under the control of the internal diameter guide cylinder 5 and the external diameter guide cylinder 6 until the lamination reaches a certain height (thickness) and is then cut. In addition, the wound strip lamination 10 is integrated by applying pressure to it from above and below and caulking it, and then it is removed from the winding device to obtain a stator core 20.

As shown in FIG. 4, the end portions of the two strips 2 are exposed at the beginning and end of the winding, and it is clear that the stator core 20 was manufactured by simultaneously winding the two strips 2

Thus, according to Embodiment 1, two strips 2 are punch formed from a single long band of sheet steel 4, the two strips 2 are stacked and integrated to form a single strip lamination 10, and the single strip lamination 10 is wound up to produce a stator core 20, and so winding time can be reduced without loss of performance, and the stator core can be produced at reduced cost.

For instance, when producing a 27 mm high stator core, the conventional method of manufacture requires that the strip 2 be wound 27 times, but because the strip lamination 10 in Embodiment 1 is composed of two stacked strips 2, only about 14 turns are required, which is roughly half the number of turns. So, if the winding speed is the same, the winding time is halved and costs can be reduced. Furthermore, since the thickness of each of the strips 2 being wound in Embodiment 1 is the same as that of the strip in the conventional method of manufacture, the same performance can be attained as in the conventional method of manufacture.

Now, if a single 2 mm thick strip is wound in order to halve the winding time, eddy currents increase during power generation and core loss increases.

If, on the other hand, a single 0.5 mm thick strip is wound in order to reduce eddy currents during power generation and suppress core loss, Embodiment 1 enables output to be increased during power generation without requiring any more winding time than that required conventionally.

Also, when manufacturing the strip lamination 10, two strips 2 punched from a single long band of sheet steel 4 are turned over and stacked together. During the punching process, burring occurs in both strips 2 in the direction of the punch action, but by turning the two strips 2 over and stacking them together, the burring in each of the strips 2 faces in the same direction. Now, because the burring on each of the two strips 2 does not interfere with that on the other when they are stacked, misalignment of tooth portions 2a and core back portions 2b is reduced, which facilitates stacking of the two strips 2 and also prevents the formation of unwanted gaps between the strips 2.

In addition, burring no longer interferes when the strip laminate 10 is wound, and so unwanted gaps do not form between the strip laminate 10 and misalignment of tooth portions 2a and core back portions 2b is reduced when the strip laminate 10 is wound.

Also, according to Embodiment 1, because the stator core 20 is composed by winding two integrated strips 2, the number of turns required to wind the strips 2 is reduced, enabling a stator core to be obtained more cheaply.

Furthermore, in Embodiment 1 above, the two strips 2 are described as being integrated by welding, but the method of integration of the two strips 2 is not limited to welding and may be, for example, caulking.

Also, in Embodiment 1 above, the wound strip lamination 10 is described as being integrated by applying pressure to it from above and below and caulking it, but the method of integration of the wound strip lamination 10 is not limited to caulking and may be, for example, welding.

Also, in Embodiment 1 above, the two strips 2 are described as being formed from a single band of sheet steel 4 such that the protrusions and recesses of their respective tooth portions 2a are intermeshed, but the two strips 2 may be formed side by side over the width of a single band of sheet steel 4 such that their tooth portions 2a point in the same direction. In that case, the disadvantage is that the yield drops, but then it is not necessary turn the two strips 2 over to stack them, and so the stacking operation can be improved significantly.

Embodiment 2

Figure 5:
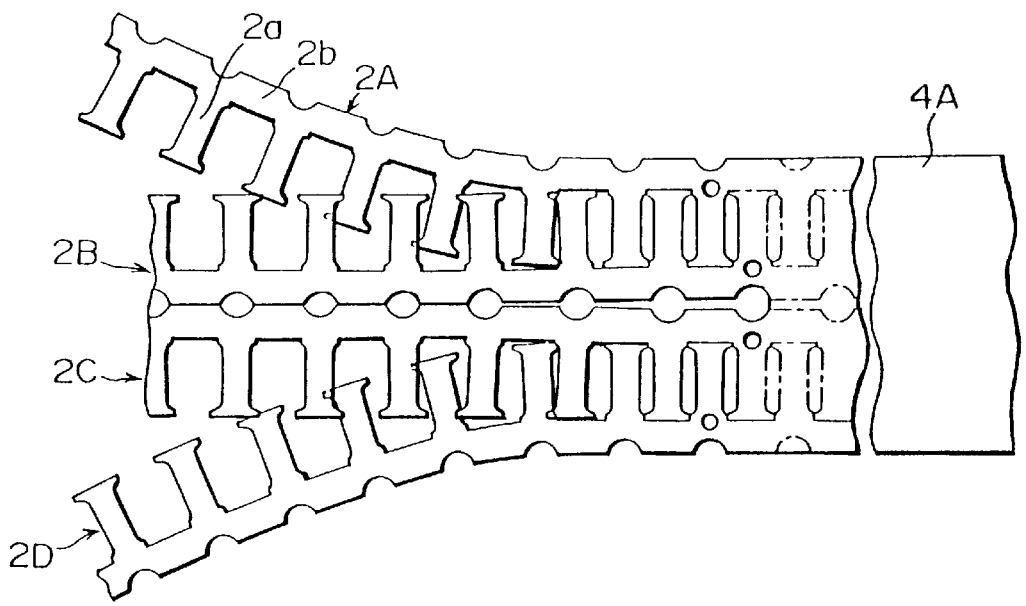
FIG. 5 is a plan view explaining a process of punching sheet steel in the method of manufacture for a stator core according to Embodiment 2 of the present invention.

In Embodiment 2, 1 mm thick, 44 mm wide sheet steel 4A is fed to a press and, as shown in FIG. 5, the band of sheet steel 4A is formed by the press into four strips 2A, 2B, 2C, 2D having tooth portions 2a and core back portions 2b. Next, the four strips 2A, 2B, 2C, 2D are separated and two strips 2A, 2C are stacked and integrated to make a strip lamination 10 and two strips 2B, 2D are stacked and integrated to make another strip lamination 10. The rest of the construction has the same composition as Embodiment 1 above.

In Embodiment 2, four strips 2A, 2B, 2C, 2D are punched from a single band of sheet steel 4A, and strips 2A, 2C (2B, 2D), whose tooth portions point in the same direction, are stacked together.

Now, the direction of the burring in the two stacked strips 2A, 2C (2B, 2D) is the same, and so the burring on each of the two strips 2A, 2C (2B, 2D) does not interfere with that on the other when they are stacked and no unwanted gaps occur between the strips 2A, 2C (2B, 2D).

Thus, according to Embodiment 2, the troublesome stacking operation of Embodiment 1, in which the two punched strips 2 must be turned over so that the burring on each faces in the same direction, is not required during stacking of two strips, and handling is made that much easier and costs can be reduced.

Embodiment 3

Figure 6:
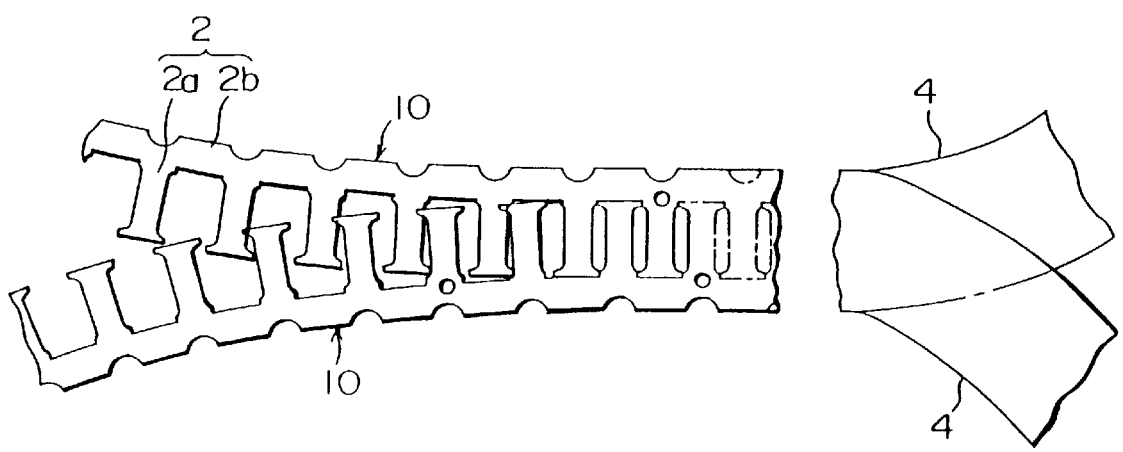
FIG. 6 is a plan view explaining a process of punching sheet steel in the method of manufacture for a stator core according to Embodiment 3 of the present invention.
Figure 7:
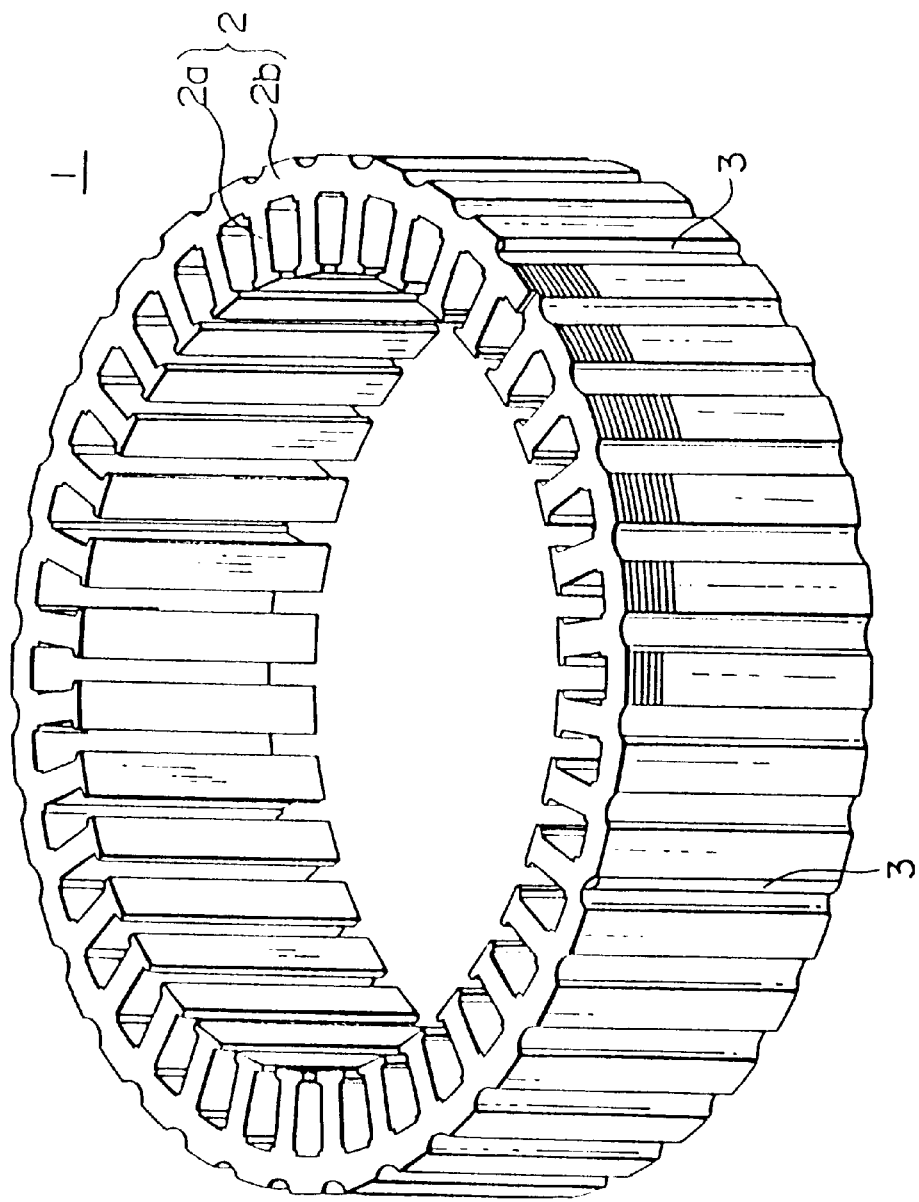
FIG. 7 is a perspective view showing a conventional stator core.
Figure 8:
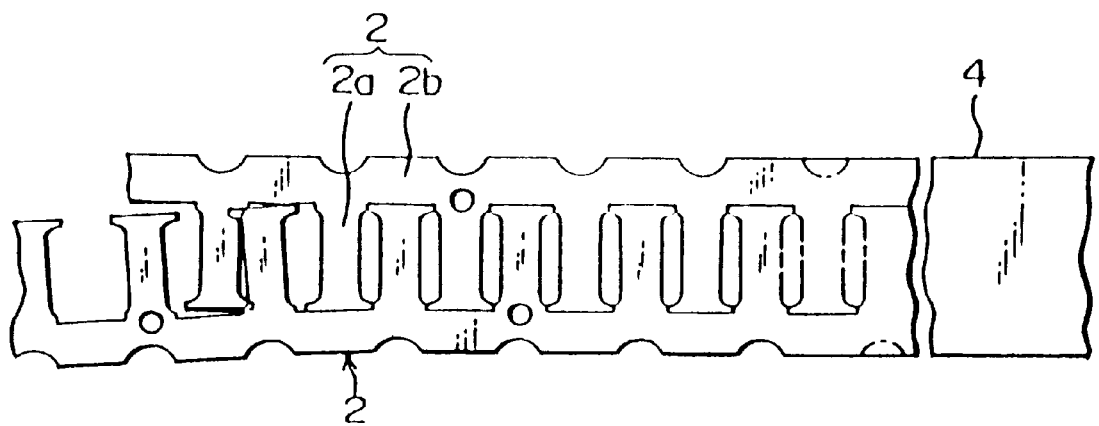
FIG. 8 is a plan view explaining the process of punching sheet steel in a conventional method of manufacture for a stator core.
Figure 9:
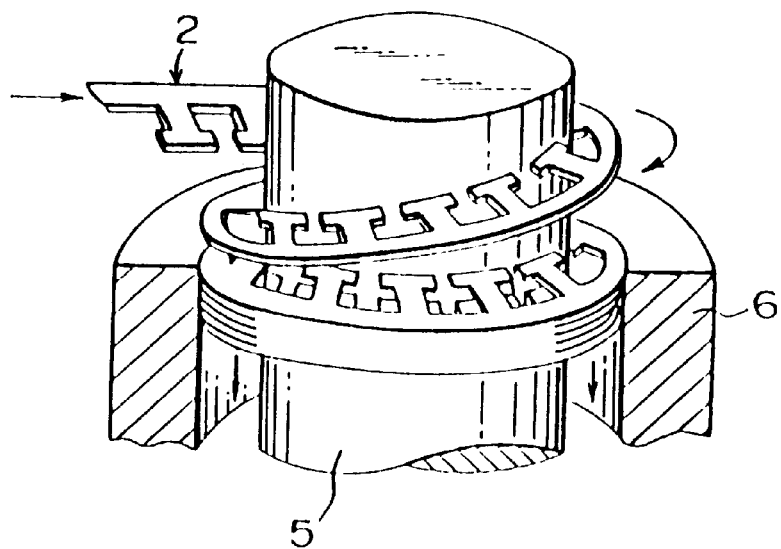
FIG. 9 is a perspective view explaining the process of winding strips in a conventional method of manufacture for a stator core.

In Embodiment 3, two bands of 1 mm thick, 22 mm wide sheet steel 4 are stacked and integrated by welding, then fed to a press and, as shown in FIG. 6, the two bands of sheet steel 4 are formed by the press into two strip laminations 10 having tooth portions 2a and core back portions 2b. Each of the strip laminations 10 thus formed is then fed to a winding process. The rest of the construction has the same composition as Embodiment 1 above.

Consequently, according to Embodiment 3, strip laminations 10 can be formed from two stacked and integrated strips 2 during the punching process, so that the troublesome stacking operation, in which two punched strips 2 must be stacked with their tooth portions 2a and core back portions 2b aligned and integrated, is not required and costs can be reduced considerably.

Furthermore, in Embodiment 3 above, the two bands of sheet steel 4 are described as being fed to the press after being stacked and integrated by welding, but the two bands of sheet steel 4 may be stacked and fed to the press and integrated by caulking the two bands of sheet steel 4 when the tooth portions 2a and core back portions 2b are punched. Also, two presses may be disposed in series so that the punching process for the tooth portions 2a and core back portions 2b and the caulking process can be carried out in quick succession.

Also, in each of the above embodiments, two stacked strips 2 are described as being wound simultaneously, but the number of strips 2 wound is not limited to two, and may be three, or even four or more.

Since the present invention has been constructed in the above-described manner, there are the below-mentioned effects.

According to the present invention, a plurality of strips made of sheet steel formed with tooth portions and core back portions are stacked such that the tooth portions line up together and the core back portions line up together and are wound spirally, and so strip winding time can be reduced and a cheap stator core can be obtained without loss of performance.

Also, the present invention is provided with a punching process in which strips formed with tooth portions and core back portions are punched from a long band of sheet steel, a stacking process in which a plurality of the strips are stacked such that the tooth portions line up together and the core back portions line up together and the stacked plurality of strips are integrated to form strip laminations, and a winding process in which the strip lamination is wound spirally and the wound strip lamination is integrated, and so winding time is reduced and a stator core can be manufactured at low cost without loss of performance.

Also, in the punching process, a plurality of strips formed with tooth portions and core back portions may be punched from a single long band of sheet steel, and in the stacking process, strips with their tooth portions pointing in the same direction may be stacked together and integrated to form strip laminations, and so the burring on each of the stacked plurality of strips faces in the same direction, the stacking operation is facilitated, and the formation of unwanted gaps between the strips is also prevented.

Also, in the punching process, at least one pair of strips may be punched over the width of the sheet steel such that two of the strips form a pair by intermeshing the protrusions and recesses of their respective tooth portions, and so the yield can be improved.

Also, the present invention may be provided with a punching process in which strip laminations having tooth portions and core back portions are punched from a stacked plurality of long bands of sheet steel, and a winding process in which the strip laminations are wound spirally and the wound strip laminations are integrated, and so the strip winding process becomes unnecessary and a stator core can be manufactured at low cost without loss of performance.

What is claimed is:

1. A stator core comprising:
   a plurality of strips of sheet steel stacked and integrated to form a single strip lamination, said single strip lamination being wound spirally and having tooth portions, core back portions and notches formed at a position of the core back portions opposite to each of the tooth portions, said plurality of strips being stacked such that said tooth portions line up together, said core back portions line up together, and said notches line up together such that winding time is reduced.

* * * * *